X8311
H. Mills,
Making Gun-Barrels,
Patented July 12, 1834.
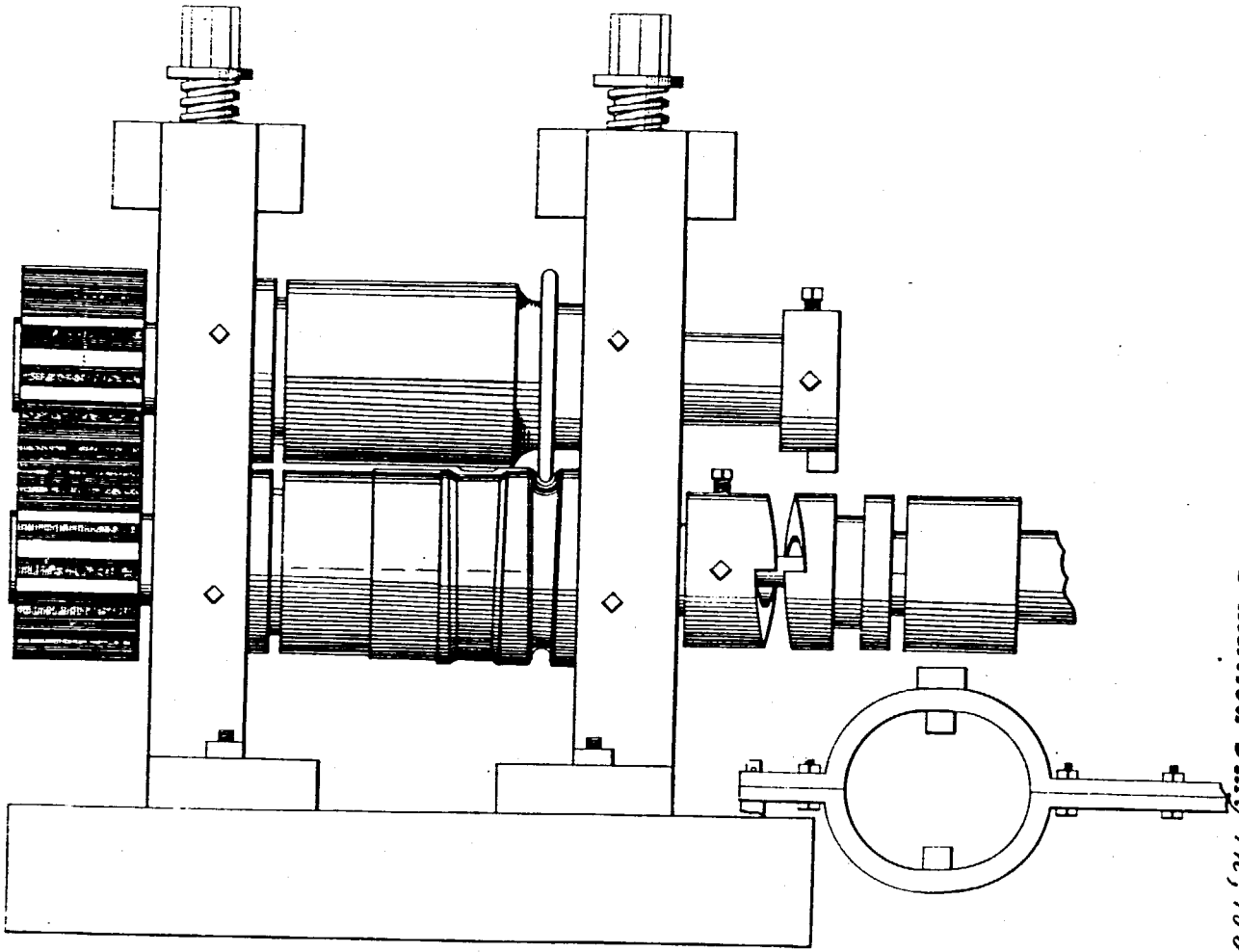
N. PETERS, PHOTO-LITHOGRAPHER, WASHINGTON, D. C.

X 8311

UNITED STATES PATENT OFFICE.

HARVEY MILLS, OF SPRINGFIELD, MASSACHUSETTS.

IMPROVED METHOD OF AND PROCESS FOR MANUFACTURING PLATE FOR GUN-BARRELS.

Specification forming part of Letters Patent dated July 12, 1834.

*To all whom it may concern:*

Be it known that I, HARVEY MILLS, of Springfield, Hampden county, Massachusetts, have invented a new and useful improvement in the method and process of manufacturing plate for gun-barrels by rolling instead of drawing by hammers, as is now practiced, which method and process are fully set forth and specified in the words following, viz:

I fit up a pair of rollers about two feet in length between the frames (the housen,) the circumference of which is a few inches greater than is required for the length of the plate, and gear them together with pinions on the outside of the frames in the usual way. The plates are rolled from flat bars that are about three-fourths of an inch in thickness and wide enough to give sufficient width to the butt of the plate by rolling longitudinally, the bars being previously cut to such length as give them the weight required by well-known process of immersion in a fluid.

As the form of plates for gun-barrels are required to be tapering both in their width and thickness, being considerably narrower and thinner at the muzzle than at the butt, I reduce the bar to a proper taper in its width by rolling it edgewise in a groove or grooves that are formed in one or both of the rollers of sufficient width to receive the thickness of the bar, the bottom of which groove or grooves is turned sufficiently eccentric to produce the taper desired. It is reduced to the thickness of the butt uniformly throughout its length by the common process, a part of the length of each roller being turned concentric for that purpose. It is reduced in thickness tapering from the butt to the nozzle, or through any part of its length by a straight or curved taper, as may be required by turning part of the length of one or both of the rollers sufficiently eccentric to give the taper required. The scarfing of the edges is effected by passing it through a groove sunk in one of the rollers, the bottom of which groove is turned to the same concentric curve that is required for the last described operations, the edges of which are tapered to suit the varying width of the plate and beveled sufficiently to give the proper angle to the scarf. The opposite roller at the place where this operation is performed is turned concentric. The last operation is that of grooving, which leaves it fully prepared for welding. This is effected by a tongue being turned concentric on one of the rollers, the outer extremity of which is semicircular and thickness a little greater than the diameter of the mandrel used by the welder. The opposite roller has a semicircular groove, the center of the arc of which is also the center of the arc of the tongue of its fellow. This groove is eccentric in its depth and varying in its width to suit the varying thickness of the plate. This last operation leaves a transverse section of the plate to appear nearly like the letter U.

That I may be able to place the end of the plate while in the process of rolling exactly at the termination of the different concentric curves, I have constructed a method of engaging and disengaging the rollers from the driving-shaft, which is effected in the following manner: I secure firmly to the end of the driving-shaft a box of about eight or ten inches in length, with a hole through it of four or five inches square, the box to project rather more than half its length beyond the end of the shaft. Into the projecting end of the roller to be driven a hole is bored about two inches in diameter and about three and a half in depth. On the projecting end a clutch-box is securely fixed with the clutches only projecting beyond the end of the roller. The sliding clutch is made to match the one attached to the roller, and has on one end a square projection to fit the hole in the box on the driving-shaft, and on the other end a round one to fit the hole in the roller with sufficient distance between the shaft and the roller for the clutches to escape each other when disengaged. The sliding clutch has a groove turned in it for the purpose of applying a lever to engage the shaft with the roller. The disengaging is effected by a box being securely fixed upon the upper roller, with an angular cam projecting from it that comes in contact with an angular projection on the lever. By these means the roller will perform exactly one revolution after they are engaged until they are disengaged, thereby leaving them at the most suitable place for receiving the plate.

The first operation upon a bar after being cut to a proper length is to reduce it to its taper in width by rolling it edgewise. It is then reduced to the thickness of the butt-end

X8311 of a uniform thickness throughout its length. It is then again passed through edgewise to make its taper in width more accurate. It is next reduced to its taper in thickness, then passed through the groove for scarfing. The last operation—the passing it through between the tongue and the groove for grooving—the rollers are engaged at each operation by the hand of the workman being applied to the end of the lever at the moment when the work is in readiness to pass through the rollers.

What I claim as my invention or improvement is—

The above-described method and process of manufacturing plates for gun-barrels and the manner of engaging and disengaging the rollers as therein fully set forth and described.

HARVEY MILLS.

Witnesses:
E. D. BEACH,
JAMES W. CROOKS.